United States Patent [19]

Farrell, Sr. et al.

[11] 4,338,839

[45] Jul. 13, 1982

[54] TIRE CUTTING MACHINE

[76] Inventors: Warren M. Farrell, Sr., 308 S. Avenue A; Warren M. Farrell, Jr., Rte. 4, Box 69, both of Elgin, Tex. 78621

[21] Appl. No.: 185,569

[22] Filed: Sep. 9, 1980

[51] Int. Cl.[3] .......... B26D 1/09; B26D 5/12; B29H 19/02

[52] U.S. Cl. .......... 83/620; 83/636; 83/639; 83/923; 83/925 R

[58] Field of Search .......... 83/622, 620, 923, 925 R, 83/639, 636; 241/101.4

[56] References Cited

U.S. PATENT DOCUMENTS

| | | | |
|---|---|---|---|
| 1,943,113 | 1/1934 | Daum | 83/620 |
| 2,297,177 | 9/1942 | Tiffany | 83/620 |
| 3,039,343 | 1/1962 | Richards | 83/622 X |
| 3,304,823 | 2/1967 | Nowak | 83/622 X |
| 3,911,772 | 10/1975 | Kisielewski | 83/923 X |
| 3,922,942 | 12/1975 | Fawcett et al. | 83/923 X |
| 3,958,482 | 5/1976 | Claesson | 83/620 X |

*Primary Examiner*—Frank T. Yost

*Attorney, Agent, or Firm*—Arnold, White & Durkee

[57] ABSTRACT

Apparatus for cutting a tire into a number of segmented pieces utilizes a plurality of pairs of shear-cutting blades actuated by a hydraulic cylinder ram. One blade of each pair is affixed to a carriage movable on a track secured to a frame. The other blade of each pair is affixed to the frame. The hydraulic cylinder ram moves the carriage on the track so as to effect a cutting action of the blades, and result in a tire placed within a tire-cutting area defined by the frame being cut into segmented pieces.

1 Claim, 7 Drawing Figures

TIRE CUTTING MACHINE

BACKGROUND OF THE INVENTION

The present invention relates to tire-scrapping machinery; and more particularly, it relates to apparatus for cutting rubber tires into segmented pieces for disposal.

One of the major problems in solid waste disposal is the handling of rubber tires. In every major metropolitan area of the United States, there are literally tens of thousands of old tires to be disposed of every month. In the past, disposal by burying and burning has been relied upon. However, because of the air pollution created by the disposal of old tires by burning, laws have been effected which place strict regulations on this manner of disposal. Also, strict regulations now control the burying of old tires in landfills; there is now the requirement that old tires be cut into pieces before burying to prevent tires from working their way to the surface at the landfill.

Heretofore, a number of proposals for the disposal of rubber tires by dismemberment have been made. Each, however, has involved the shredding of discarded tire carcasses into fragmented pieces. Representative of such rubber tire shredding apparatus is that disclosed in U.S. Pat. No. 4,180,004 assigned to Tire-Gator, Inc. of Houston, Tex. Another similar piece of equipment for shredding tires is the TIRE SCRAPPER MACHINE which has been offered by Alternative Energy Company. The structure of both machines comprises interengaging, rotary feeder-cutter wheels mounted on counter rotating shafts, which pull a rubber tire through a feed path between the wheels and simultaneously shred the tire with cutting implements.

SUMMARY OF THE INVENTION

In accordance with the present invention, there is provided a machine for cutting rubber tires, such as automobile and truck tires. Specifically, the present invention provides tire cutting apparatus which cuts a rubber tire carcass into segmented pieces, such as, for example, quarters.

The tire cutting apparatus includes a frame defining a tire-cutting area accessible from a direction transverse to the longitudinal axis of the frame. An elongate guide track is secured in fixed relation to the frame with a carriage being mounted thereon for reciprocating movement. At least one pair, and preferably four pairs, of shear-cutting blades are included, for cutting a tire placed in the tire-cutting area of the frame. One blade of each pair is mounted to the movable carriage, with the other blade of the pair being affixed to the frame. Each pair of shear-cutting blades operates by action of opposed cutting edges to cut through the tire.

Some means for moving the carriage on the elongate guide track to effect cutting action of the blades is also included. Suitably, the carriage moving means comprises a hydraulic cylinder ram connected between the frame and the carriage. However, other types of force-drive systems could be equally effective. For example, an electric or pneumatically operated drive motor linked to the carriage would effect the same function and be equivalent to a hydraulically actuated carriage moving means.

The frame may be either vertically or horizontally oriented, with the blades affixed to the frame being oriented with the cutting edge extending in a plane transverse to the vertical axis of movement of the carriage. Furthermore, the blades mounted on the moving carriage are oriented at an acute angle relative to the lower blades, thereby effecting the cutting of a tire carcass in a "sissor-type" manner.

Preferably, however, the frame is vertically oriented such that the carriage moves along a vertical axis of movement. In such an embodiment, the blades affixed to the frame, i.e., the "lower" blades, have the cutting edge placed horizontally. A tire to be cut may then be placed on its side in the tire-cutting area of the frame and supported upon the lower blades for cutting. The blades mounted to the moving carriage, i.e., the "upper" blades, are accordingly oriented at an acute angle relative to horizontal.

BRIEF DESCRIPTION OF THE DRAWINGS

A more complete appreciation of the invention and many of the attendant features thereof will become better understood by reference to the detailed description herein when considered in connection with the accompanying drawings wherein.

DESCRIPTION OF THE ILLUSTRATED EMBODIMENT

Figure 1:
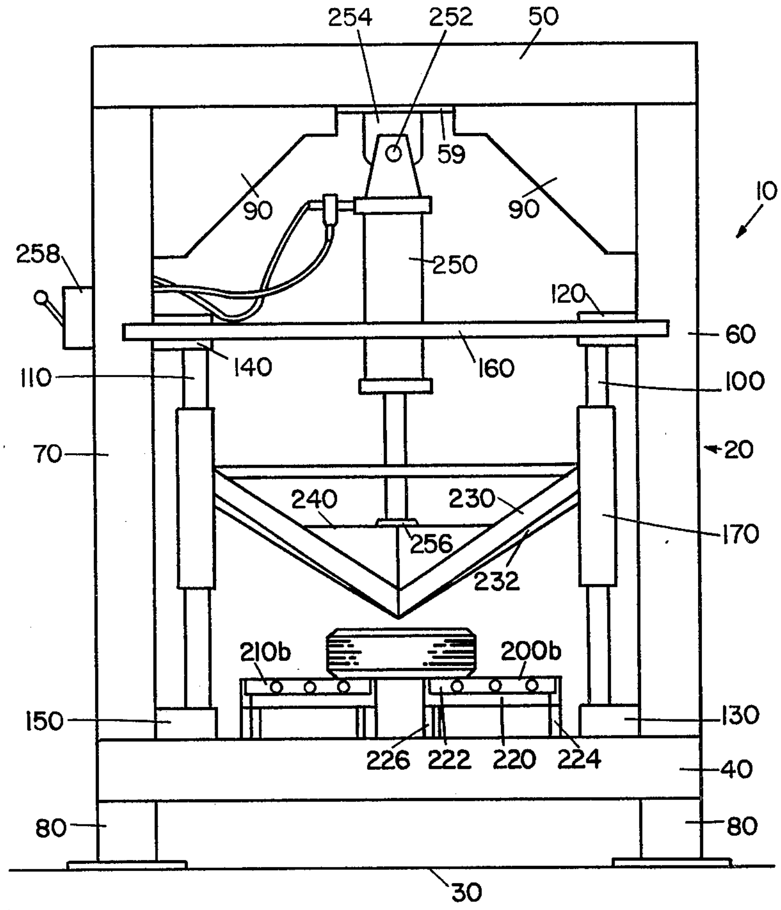
FIG. 1 is a side view of one embodiment of tire-cutting apparatus in accordance with the present invention, which shows the overall configuration of the machine.

Referring now to the drawings, and more particularly to FIG. 1, there is shown one embodiment of the tire cutting apparatus of the present invention, generally designated by the reference numeral 10. In the embodiment shown, tire cutting apparatus 10 has an upright standing frame 20 adapted to be placed on and supported by a relatively flat, horizontal surface 30. In the embodiment shown, frame 20 is a rectangular box frame having a square base 40 and a square top support structure 50. Frame 20 further includes a plurality of vertical support columns extending between base structure 40 and top support structure 50. A vertical support column extends between corresponding corners of base 40 and top structure 50; accordingly, there are four support columns, of which only columns 60 and 70 are in view. Optionally, frame 20 may further include support feet 80 at each corner for elevating base 40 above surface 30.

Figure 2:
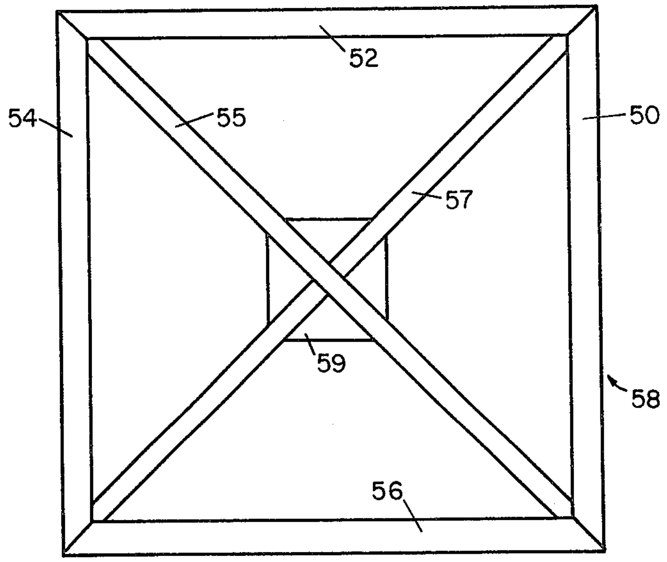
FIG. 2 is a plan view of the top support structure of the frame portion of the apparatus shown in FIG. 1.
Figure 3:
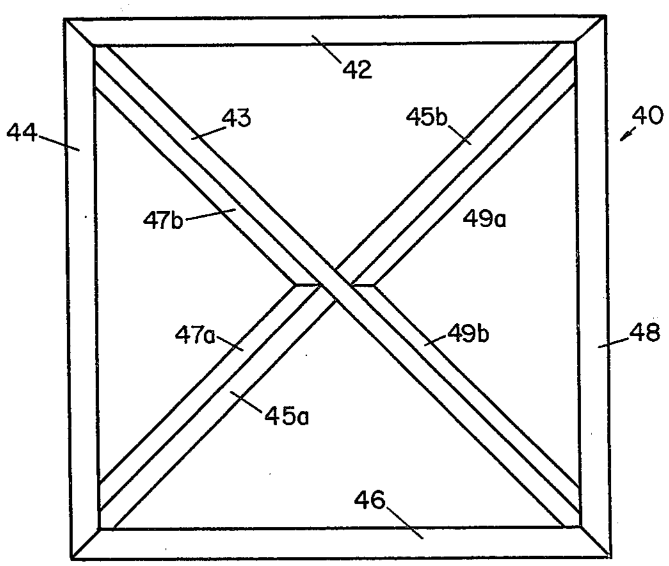
FIG. 3 is a plan view of the base structure of the frame portion of the apparatus shown in FIG. 1.

Referring briefly to FIGS. 2 and 3, there is shown in plan view top support structure 50 and base 40. As shown in FIG. 2, top support structure 50 is of a square configuration constructed of four side members 52, 54, 56, and 58, which are connected end-to-end. Also included as a part of top support structure 50 are cross brace members 55 and 57, each of which extends diagonally between opposing corners of structure 50. There is further included a support plate 59, the function and purpose for which will be described later.

Base 40 is similar in construction to top support structure 50, and includes four interconnected side members 42, 44, 46 and 48, which form a structure of a square configuration. A diagonal cross brace member 43 extends between two opposing corners of base 40. Cross brace members 45*a* and 45*b* are further included; these two members extend between the mid-point of diagonal cross brace member 43 and a corner of base 40. Base 40 further includes blade support members 47*a*, 47*b* and 49*a*, 49*b*. These members are attached to the side of a cross brace member, and are further attached at one end to a side member of base 40. Adjacent blade support members are also interconnected at their ends opposite those attached to the side member. The arrangement of the cross-bracing and blade-mounting structure of base 40 will become better understood upon consideration of the "lower" blade arrangement shown in FIG. 4.

Although the dimensions of the various structural elements of frame 20 are not critical to the present invention, for purposes of completeness, representative dimensions for the various structural elements will be provided. Suitably, base 40 and top support structure 50 may be 65″ square. That is, each of the side members of base 40 and top support structure 50 are 65″ in length. Vertical support columns 60 and 70, as well as the other two columns which are not in view, may suitably be 77″ in length. Feet support structures 80 may suitably elevate base 40 twenty inches above underlying support surface 30.

In terms of the dimensions of the material comprising the structure elements of frame 20, the side members of base 40 and top support structure 50 may suitably be 3″×6″ square tubing having a 3/16″ wall thickness. The cross bracing for both base 40 and top support structure 50 may be 3″×6″ square tubing having a ¼″ wall thickness, as are blade mounting members 47 and 49. Plate 59 on top support structure 50 may suitably be a ¾″ thick plate which is 18″ square. Finally, the vertical support columns may be 3″×6″ square tubing having a 3/16″ wall thickness.

Referring back to FIG. 1, frame 20 may further include web support plates 90. Each plate is attached, for example by welding, along one side to a vertical support column and along the adjacent side to a segment of the corresponding one of the diagonal cross braces 55 or 57.

Continuing with reference to FIG. 1, frame 20 defines a tire-cutting area accessible from a direction transverse to the longitudinal axis of the frame, for placement therein of a tire T to be cut. As used herein, "tire-cutting area" refers to the area inside the support columns.

Tire cutting apparatus 10 further includes an elongate guide track secured in fixed relation to the frame. This structure comprises four vertical rods, of which only rods 100 and 110 are in view. The upper and lower ends of each rod are fixed in relation to frame 20 by attachment to one of the vertical support columns. For example, rod 100 is attached to column 60, and rod 110 is attached to column 70. Attachment of the ends of the rods may be by means of a welded support bracket extending inwardly of the frame from the vertical support column. For example, rod 100 is secured by upper bracket 120 and lower bracket 130. Similarly, rod 110 is secured to vertical support column 70 by brackets 140 and 150. Further support for the defined elongate guide track is afforded by cross brace members extending between the upper rod securing brackets. For example, cross brace 160 is shown in FIG. 1 extending between bracket 120 and bracket 140.

The rods of the elongate guide track may suitably be 2½″ in diameter and 48″ in length. Cross brace 160 may suitably be 2″×3″ square tubing having ¼″ wall thickness.

A carriage is mounted on the elongate guide track for reciprocating movement thereon along an axis of movement. The carriage includes a plurality of sleeves, each mounted for sliding movement on one of the elongate guide track rods. For example, sleeve 170 slides on rod 100, and sleeve 180 slides along rod 110. The sleeves are interconnected by cross brace members to form a unitary carriage structure. For example, sleeves 170 and 180 are interconnected by cross brace member 190. In the embodiment shown, the carriage includes four sleeves interconnected by four cross braces to form a unitary structure which is vertically movable within frame 20 along the vertical axis of movement defined by the elongate rods secured to the frame.

The tire cutting apparatus of FIG. 1 further includes four pairs of shear-cutting blades. In FIG. 1, two pairs of blades are in view; one pair is that comprising upper blade 200*a* and lower blade 200*b*, and the other pair is that comprising upper blade 210*a* and lower blade 210*b*.

With respect to each pair of shear-cutting blades, one blade of the pair, the "upper" blade, is mounted on the movable carriage, and the other blade of the pair, the "lower" blade, is affixed to the frame.

In the embodiment shown in FIG. 1, the lower blades are oriented horizontally; that is, the lower blades are disposed in a plane transverse to the axis of movement of the carriage. Accordingly, and as shown in FIG. 1, a tire T placed in the tire cutting area within the frame is laid on its side atop the lower blades for cutting. The upper blades, which are mounted on the carriage, are disposed at an acute angle relative to the lower blades. Suitably, the upper blade of each pair is oriented at an angle of approximately 25° with respect to horizontal.

Considering blade 200*b* as a representative one of the lower blades of each pair, blade 200*b* comprises an elongate metal bar having bolted thereto a hard tempered steel insert 222 which provides the actual cutting edge of the blade. Metal bar 220 is supported on base 40 of the frame by stanchions 224 and 226.

Considering upper blade 200*a* as a representative one of the upper blades on the movable carriage, blade 200*a* includes a metal mounting bar 230 and a hard-tempered steel insert 232 bolted to bar 230. Each of the upper blades is attached at one end to a sleeve on the carriage. The opposite ends of the blades are jointly interconnected.

The upper blades are braced by members which extend between the mounting bars of adjacent upper blades. For example, bracing member 240 extends between the mounting bars of upper blades 200*a* and 210*a*.

The steel cutting edge inserts for the upper and lower blades may suitably be D-2 tool steel available from Medallion Steel Co. in Cleveland, Ohio.

Figure 4:
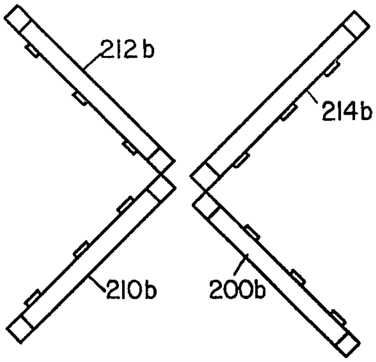
FIG. 4 is a plan view of the arrangement on the frame of the lower blades of the apparatus shown in FIG. 1.

Referring now to FIG. 4, a plan view of the arrangement of the lower blades in tire cutting machine 10 is presented. As shown, the lower blades 200*b*, 210*b*, 212*b* and 214*b* are placed approximately 90° apart from one another. In the arrangement shown, the lower blades may be mounted upon the blade mounting members 47 and 49, which are attached to the diagonal cross bracing of base 40. More specifically, blade 200*b* is secured by mounting member 49*b*. Blade 210*b* is attached to blade mounting member 47*a*, with blade 212*b* being affixed to blade mounting member 47*b*. Finally, blade 214*b* is attached to blade mounting member 49*a*. As shown in FIG. 4, mounting the lower blades in such fashion places the inward ends of blades 210*b* and 212*b* close together, and places the ends of blades 200*b* and 214*b* in close proximity. However, there is a wide separation gap between the interconnection point of ends 200*b*, 214*b* and the interconnection point of ends 210*b*, 212*b*. The open space, or gap, is necessary to accommodate passage of the interconnected ends of the upper blade mounting bars during a cutting operation, as will be more fully explained.

Figure 5:
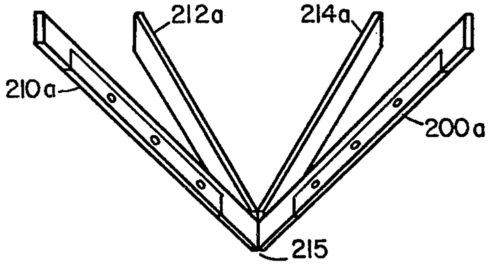
FIG. 5 is a perspective view of the arrangement of the upper blades on the carriage of the apparatus shown in FIG. 1.

Referring next to FIG. 5, there is presented a perspective view of the upper blades detached from the carriage. As shown, each of the upper blades is disposed at the chosen angle. Moreover, the upper blades are displaced 90° with respect to one another, thus corresponding to the separation between the lower blades.

Figure 6:
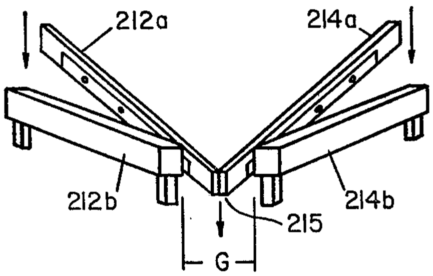
FIG. 6 is a perspective view of two of the four pairs of shear-cutting blades in the illustrated embodiment of FIG. 1, which view illustrates the manner of operation of each pair of blades.

Turning now to FIG. 6, there is presented a perspective view of two of the four pairs of shear-cutting blades. The pairs shown are those designated by reference numerals 212 and 214 in FIGS. 4 and 5. The drawing illustrates the manner of cutting of the blades. As depicted the blades operate by action of opposed cutting edges. By having the upper blade disposed at an angle relative to the lower blade, a "sissor-like" cutting action is produced.

The blade inserts for the upper and lower blades of each pair are adjusted for alignment such that the upper and lower blades pass by one another with a very close tolerance clearance; a clearance of 0.002 inch is recommended. Also as shown, the "skewed" orientation of the blades and the interconnected ends of the upper blades requires the separation gap G between the innermost positioned ends of the lower blades; otherwise, the interconnection point 215 would strike the ends of the lower blades and passage of the upper blades relative to the lower blades would be prevented.

Returning to FIG. 1, the tire cutting apparatus 10 further includes a means for moving the carriage on the elongate guide track to effect cutting action of the blades to cut a tire placed in the tire-cutting area of the frame. In the embodiment shown and being described, the carriage moving means comprises a hydraulic cylinder ram 250 connected between the frame and the carriage. The hydraulic cylinder ram is connected to the frame by a pivoted connection 252 at the top of the cylinder. The pivoted connection is provided by a vertical eyelet plate 254 attached to plate 59 of top support structure 50. The lower end of the cylinder ram is affixed by a suitable locking attachment 256 which may be a non-pivoting, pinned connection.

In addition to the hydraulic cylinder ram, the carriage moving means includes a hydraulic control system for selective operation of the hydraulic cylinder ram. Preferably, the hydraulic system is manually operated through manual control valve 258 mounted in a box attached to the side of the tire cutting apparatus.

Figure 7:
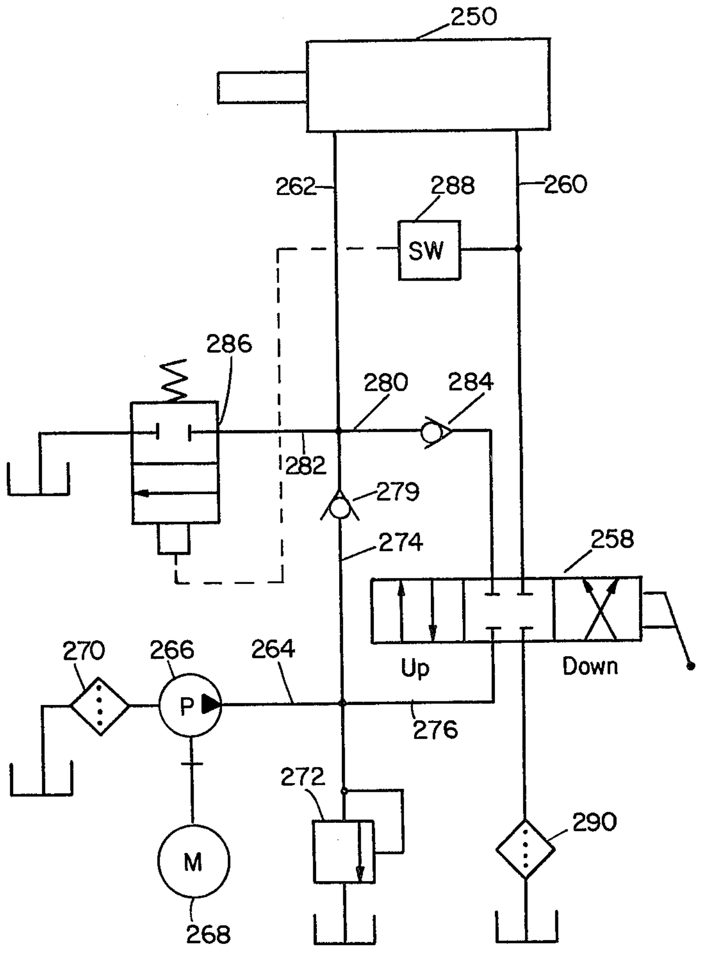
FIG. 7 is a schematic diagram of a hydraulic system for effecting controlled movement of the carriage in the apparatus shown in FIG. 1.

Referring to FIG. 7, there is presented a schematic diagram of a suitable hydraulic system for use in the tire cutting apparatus of FIG. 1. To selectively control hydraulic cylinder ram 250, a three position valve 258 is provided to route hydraulic fluid through two flow lines 260, 262 which lead to hydraulic cylinder 250. The direction of flow through lines 260, 262, establish the direction of travel of the hydraulic cylinder ram. Manual valve 258 has the three positions of UP, NEUTRAL, and DOWN.

Hydraulic fluid from a reservoir tank is supplied through a main flow line 264 by pump 266 which is driven by motor 268. Fluid drawn from the reservoir tank is filtered by filter 270. A pressure relief valve 272 "bleeds-off" excess pressure in flow line 264. Main flow line 264 splits into first and second secondary flow lines 274, 276. Line 274 has connected therein a one-way ball-check valve 278 which interconnects with flow lines 262, 280 and 282. Line 276 is connected directly to valve 258.

Flow line 280 includes a ball-check valve 284 and interconnects to valve 258. Flow line 282 includes a solenoid operated safety valve 286, which bleeds-off hydraulic fluid to the reservoir tank when pressure sensing switch 288 detects excessive pressure in flow line 260.

In operation of the hydraulic control system, when valve 258 is actuated to the UP position, pressurized hydraulic fluid being supplied by pump 266 is driven through line 276, valve 258, and check valve 284 to line 262. Hydraulic fluid pressure in line 262 causes the hydraulic cylinder ram to retract. Exhaust flow from cylinder 250 is through line 260, valve 258, and filter 290 back to the reservoir tank.

When valve 258 is actuated to the DOWN position, pressurized hydraulic fluid from pump 266 flows through line 276 to valve 258 where it is routed into flow line 260. Pressurized hydraulic fluid entering cylinder 250 causes extension of the hydraulic ram. Exhausting hydraulic fluid through line 262 is sent through check valve 278 for return back to the reservoir tank.

Suitable devices for implementing the primary components of the hydraulic system of FIG. 7 may be as follows:

| | |
|---|---|
| Cylinder 250 | Ortman Miller 3THG (6" bore; 24" stroke) |
| Valve 258 | Rexroth 4WBH25G 30/10 |
| Pump 266 | Hydreco 22 PR 220546 |
| Motor 268 | Lincoln, 3 phase, 1800 R.P.M., 230–460 volt |

Preferably, to produce effective cutting action by the blades, the carriage moving means should produce 27,000–30,000 lbs. of force.

The foregoing description of the invention has been directed to a particular preferred embodiment for purposes of explanation and illustration. It will be apparent, however, to those skilled in this art that many modifications and changes in the apparatus may be made without departing from the essence of the invention. Quite clearly, the tire cutting apparatus of the present invention may be adapted for horizontal disposition rather than the vertical orientation shown. Additionally, the elongated track may be provided by means other than the rod and sliding sleeves described. Moreover, the carriage moving means may be types of equipment other than hydraulic cylinder equipment. For example, the carriage moving means may comprise an electrical or pneumatically driven motor interconnected to the carriage by an interconnecting mechanism such as a drive chain and sprockets or other mechanical interconnection. It is the Applicants' intention in the following claims to cover all such equivalent modifications and variations as fall within the scope of the invention.

What is claimed is:

1. Apparatus for cutting tires, which comprises:

an upright-standing, elongate frame defining a tire cutting area accessible from the side;

the frame including a base structure having a plurality of interconnected side members giving the base structure a generally square configuration, a diagonal cross brace member extending between two opposing corners formed by the interconnection of two of the side members, first and second cross brace members, each brace extending between the mid-point of the diagonal cross brace and a corner formed by the interconnection of two of the side members, and a lower cutting blade support member attached to each cross brace member;

the frame including a top support structure;

the frame including a plurality of vertical support columns interconnecting the base structure to the top support structure;

an elongate guide track secured to said frame, the guide track comprising a plurality of vertical rods, each rod secured at its upper and lower ends to the frame;

a carriage mounted on the elongate guide track for reciprocating vertical movement thereon, the carriage comprising a slidable sleeve disposed on each of the vertical rods of the guide track and cross-bracing members interconnecting adjacent sleeves to form a unitary carriage structure;

first, second, third and fourth pairs of shear-cutting blades;

each pair of blades having an upper blade and a lower blade;

the lower blade of each pair being affixed to the base of the frame by mounting it to one of the blade support members, and being oriented with the cutting edge extending substantially horizontal, the upper blade of each pair being affixed to the movable carriage and oriented with the cutting edge extending at an acute angle relative to the cutting edge of the lower blade, the upper blades being displaced with respect to one another so as to correspond to the separation between the lower blades, the upper blade of each pair being elongated, the elongated upper blades each being attached at one end to a sleeve on the carriage and jointly interconnected at the opposite end to one another, each of said pairs of blades operating by action of opposed cutting edges to cut a tire placed on its side in the tire-cutting area within the frame; and a hydraulic cylinder ram connected between the frame and the movable carriage for vertically moving the carriage relative to the frame to effect cutting action of the blades.

* * * * *